(12) United States Patent
Hirata

(10) Patent No.: US 8,098,573 B2
(45) Date of Patent: Jan. 17, 2012

(54) BRIDGE, SYSTEM, BRIDGE CONTROL METHOD AND PROGRAM RECORDING MEDIUM

(75) Inventor: Yutaka Hirata, Tokyo (JP)

(73) Assignee: NEC Corporation, Tokyo (JP)

(*) Notice: Subject to any disclaimer, the term of this patent is extended or adjusted under 35 U.S.C. 154(b) by 151 days.

(21) Appl. No.: 12/501,047

(22) Filed: Jul. 10, 2009

(65) Prior Publication Data

US 2010/0014414 A1 Jan. 21, 2010

(30) Foreign Application Priority Data

Jul. 16, 2008 (JP) ................................. 2008-184681

(51) Int. Cl.
*G06F 11/00* (2006.01)

(52) U.S. Cl. ........................................................ 370/216
(58) Field of Classification Search .................... 370/216
See application file for complete search history.

(56) References Cited

U.S. PATENT DOCUMENTS

| 2003/0065861 A1* | 4/2003 | Clark et al. .................... 710/305 |
| 2010/0110880 A1* | 5/2010 | Kulkarni et al. ............... 370/221 |

FOREIGN PATENT DOCUMENTS

| JP | 1997319720 A | 12/1997 |
| JP | 10-336226 A | 12/1998 |
| JP | 2004201140 A | 7/2004 |
| JP | 2006254341 A | 9/2006 |
| WO | WO 2008037679 A1 * | 4/2008 |

OTHER PUBLICATIONS

Clark, Kennedy and Kevin Hamilton. "Cisco LAN Switching" CCIE professional development. Cisco Press. Nov. 2004.*
Japanese Office Action for JP2008-184681 issued Apr. 13, 2010.

* cited by examiner

*Primary Examiner* — Jason Mattis
*Assistant Examiner* — Stephen J Clawson

(57) ABSTRACT

A bridge according to an exemplary aspect of the invention comprises a BPDU-receiver which receives a BPDU packet of an STP (Spanning Tree Protocol) including failure information and an error-handler which performs error handling according to the failure information.

19 Claims, 9 Drawing Sheets

BRIDGE, SYSTEM, BRIDGE CONTROL METHOD AND PROGRAM RECORDING MEDIUM

This application is based upon and claims the benefit of priority from Japanese patent application No. 2008-184681, filed on Jul. 16, 2008, the disclosure of which is incorporated herein in its entirety by reference.

TECHNICAL FILED

The present invention relates to a bridge, a system, a bridge control method and a program recording medium, and in particular, to a bridge, a system, a bridge control method and a program recording medium which perform failure monitoring.

BACKGROUND ART

In distributed process processing with more than one computer, a technological example in which a process monitoring daemon in a computer sends a heartbeat message periodically to determine if there is abnormality in others is disclosed in Japanese Patent Application Laid-Open No. 1997-319720. Also as a technology related to the present invention, a bridge for mesh type networks using a spanning tree protocol (STP) is disclosed in Japanese Patent Application Laid-Open No. 2004-201140.

SUMMARY

An exemplary object of the present invention is to provide a bridge, a system, a bridge control method and a program which reduce the communication load on a network, for example.

A bridge according to an exemplary aspect of the invention includes a BPDU-receiver which receives a BPDU packet of an STP (Spanning Tree Protocol) including failure information and an error-handler which performs error handling according to the failure information.

A computer-readable recording medium according to an exemplary aspect of the invention stores a program which makes a computer function as a BPDU-receiver which receives a BPDU packet of an STP (Spanning Tree Protocol) including failure information; and an error-handler which performs error handling according to the failure information.

A bridge control method according to an exemplary aspect of the invention includes receiving a BPDU packet of an STP (Spanning Tree Protocol) including failure information and performing error handling according to the failure information.

BRIEF DESCRIPTION OF THE DRAWINGS

Exemplary features and advantages of the present invention will become apparent from the following detailed description when taken with the accompanying drawings in which.

EXEMPLARY EMBODIMENT

Figure 1:
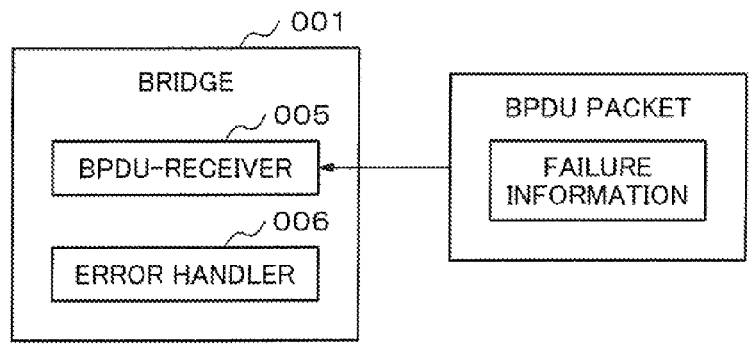
FIG. 1 is a diagram showing the outline of the exemplary embodiment.

FIG. 1 is a diagram showing the outline of an exemplary embodiment. A bridge 001 receives a BPDU packet of the STP, and performs protocol processing. The bridge 001 includes a BPDU-receiver 005 which receives a BPDU packet of the STP including failure information and an error handler 006 which executes processing according to the failure information.

As a result, the exemplary embodiment has an effect on reducing the communication load on a network. The reason of this is that the fault information necessary for a heartbeat method to monitor daemon processes is received included in a BPDU packet, and it is possible to omit implementing a heartbeat method for that purpose. In the present invention, a BPDU packet of the STP is extended or modified so as to include information necessary for the heartbeat method.

Before describing a server system 100 of this exemplary embodiment, a server system 100 which adopts a heartbeat method, a physical network configuration of the server system 100, a logical network configuration of a server system 100 to which the STP is applied and a flow of a BPDU packet in the server system 100 to which the STP is applied are described referring to FIGS. 2 to 5 in turn.

Figure 2:
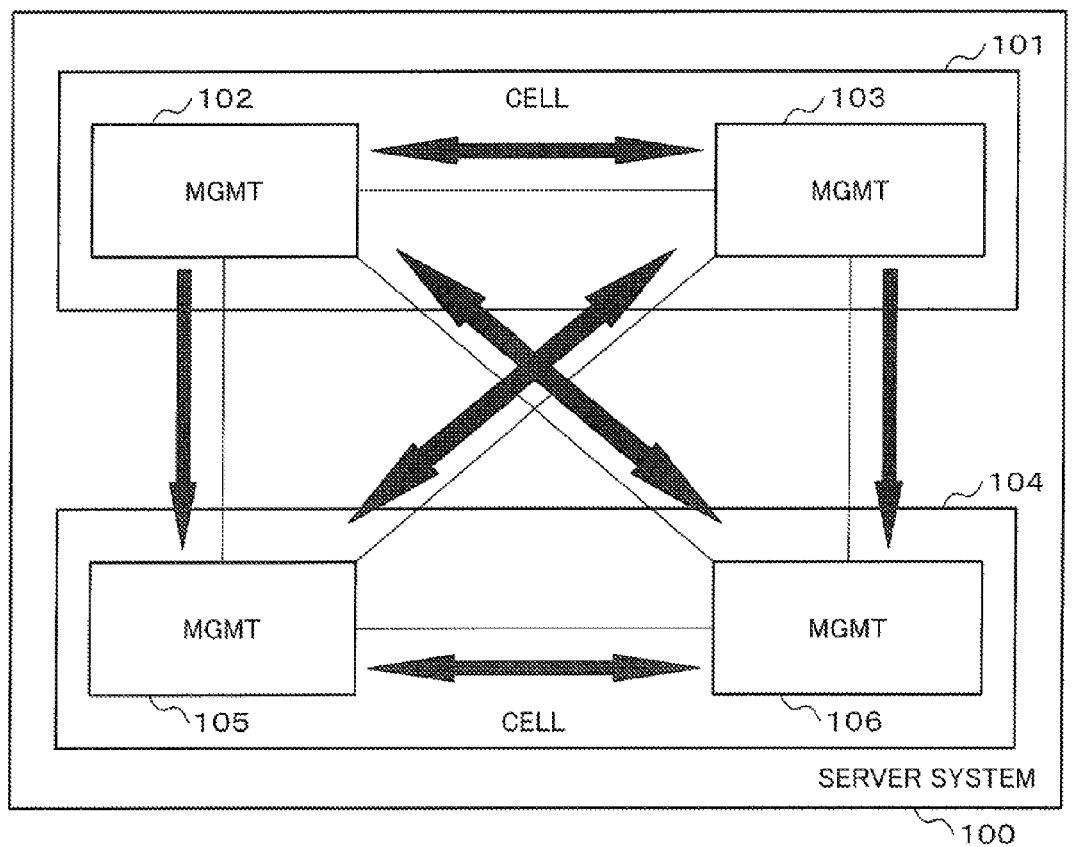
FIG. 2 is a diagram showing a server system 100 which adopts a heartbeat method.

FIG. 2 is a diagram showing a server system 100 that adopts a heartbeat method.

The server system 100 is a computer system used for core or mission critical computer systems. The server system 100 is provided with two CELLs (a CELL 101 and a CELL 104). The CELL 101 and 104 are base boards of the server system 100. A base board corresponds to a motherboard of a personal computer. The CELL 101 includes two MGMTs (ManaGeMenT Board), a MGMT 102 and a MGMT 103.

Both MGMT 102 and 103 are located in the CELL 101 in order to realize duplication. Either of the MGMT 102 and 103 becomes a master and controls the CELL 101. For example, when the MGMT 102 which is the current master has a failure, the MGMT 103 becomes a new master and controls the CELL 101 instead.

The MGMT 102 and 103 are controlled by BMCFW (Baseboard Management Controller Firm Ware) which operates on each MGMT.

BMCFW is a firmware program for controlling the MGMT 102 and 103 and is a kind of built-in software. BMCFW is executed by a processor (not shown) in each MGMT.

Similarly, the other CELL (CELL 104) is mounted on the server system 100. The CELL 104 includes a MGMT 105 and a MGMT 106.

In the server system 100 that monitors life and death of important processes by a heartbeat method, the heartbeat function is implemented on each daemon process on BMCFW. Such monitored processes are executing, on BMCFW, full-time operating service programs important for system operation.

In the server system 100 in FIG. 2, a heartbeat packet is sent and received periodically between the MGMT 102 and the MGMT 103, the MGMT 102 and the MGMT 105, the MGMT 102 and the MGMT 106, the MGMT 103 and the MGMT 105, the MGMT 103 and the MGMT 106, and the MGMT 105 and the MGMT 106, respectively. Because a heartbeat is cut off when a failure occurs in a network route between the MGMTs or in a MGMT itself, the server system 100 can detect the failure immediately.

However, in the server system 100 of FIG. 2, when the number of heartbeat packets is increased according to increase of the number of processes or the like, the network traffic in the system is increased, and as a result, detection delay of a MGMT failure and false detection of a failure may occur.

Figure 3:
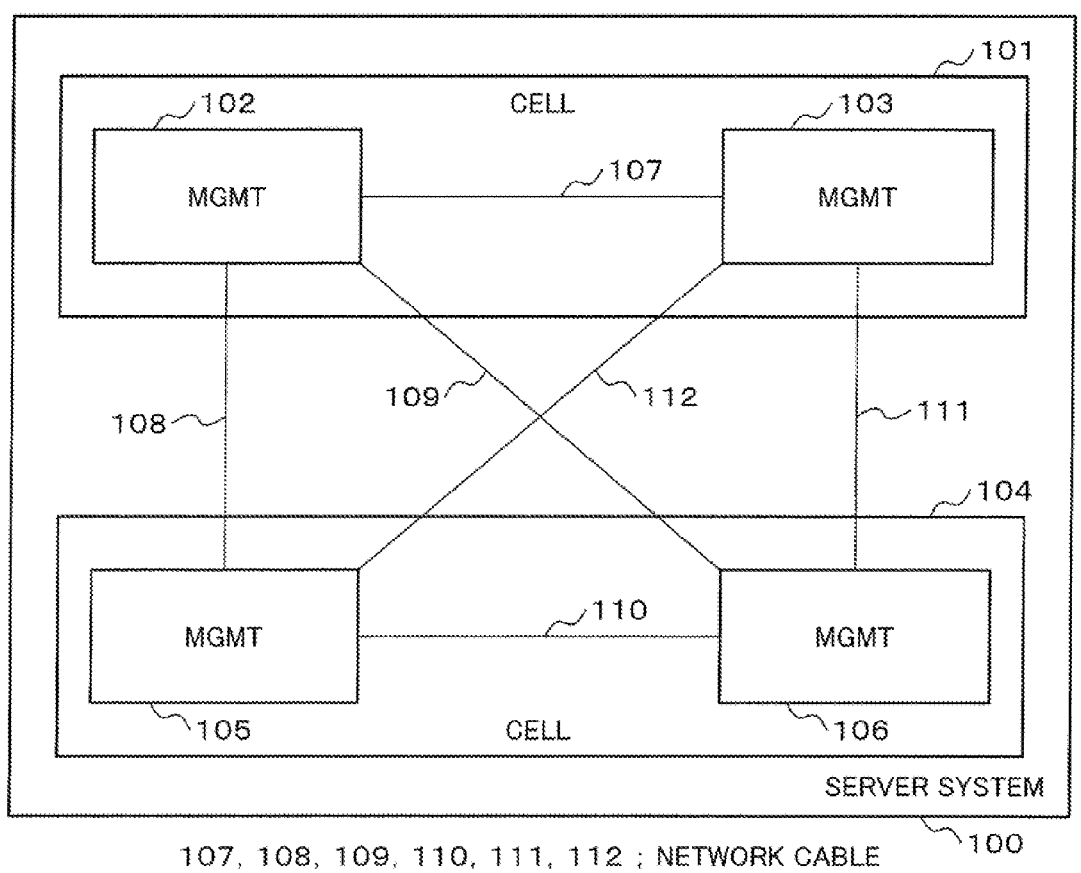
FIG. 3 is a diagram showing a physical network configuration of a server system 100.

FIG. 3 is a diagram showing a physical network configuration of the server system 100.

A network 107 indicates a network cable connecting the MGMT 102 and the MGMT 103. Similarly, a network 108, a network 109, a network 110, a network 111, and a network 112 are network cables for connecting the MGMT 102 and the MGMT 105, the MGMT 102 and the MGMT 106, the MGMT 105 and the MGMT 106, the MGMT 103 and the MGMT 106 and the MGMT 103 and the MGMT 105, respectively. Network communication by Ethernet (registered trademark) or the like can be performed between the MGMTs via a network cable.

The network configuration of the server system 100 in FIG. 3 employs a ring network topology, and loops are formed in the network. Because of loops in the network, when a broadcast packet is transmitted on a network route, the packet keeps turning forever on network routes and a broadcast storm (flooding) occurs. When a broadcast storm occurs, all the network routes will not be usable, and a network failure occurs.

In order for BMCFW to enable sending and receiving a network packet, the loops in the network need to be eliminated. To achieve this, it is necessary to cut a network cable logically, and make the network topology a tree structure. A scheme for realizing that is the spanning tree protocol (STP: Spanning Tree Protocol). STP is specified by IEEE (Institute of Electrical and Electronics Engineers, Inc). A network node in the spanning tree protocol is called a bridge, and MGMT is a bridge in the server system 100 of FIG. 3. MGMT builds a logical network configuration using the spanning tree protocol.

Figure 4:
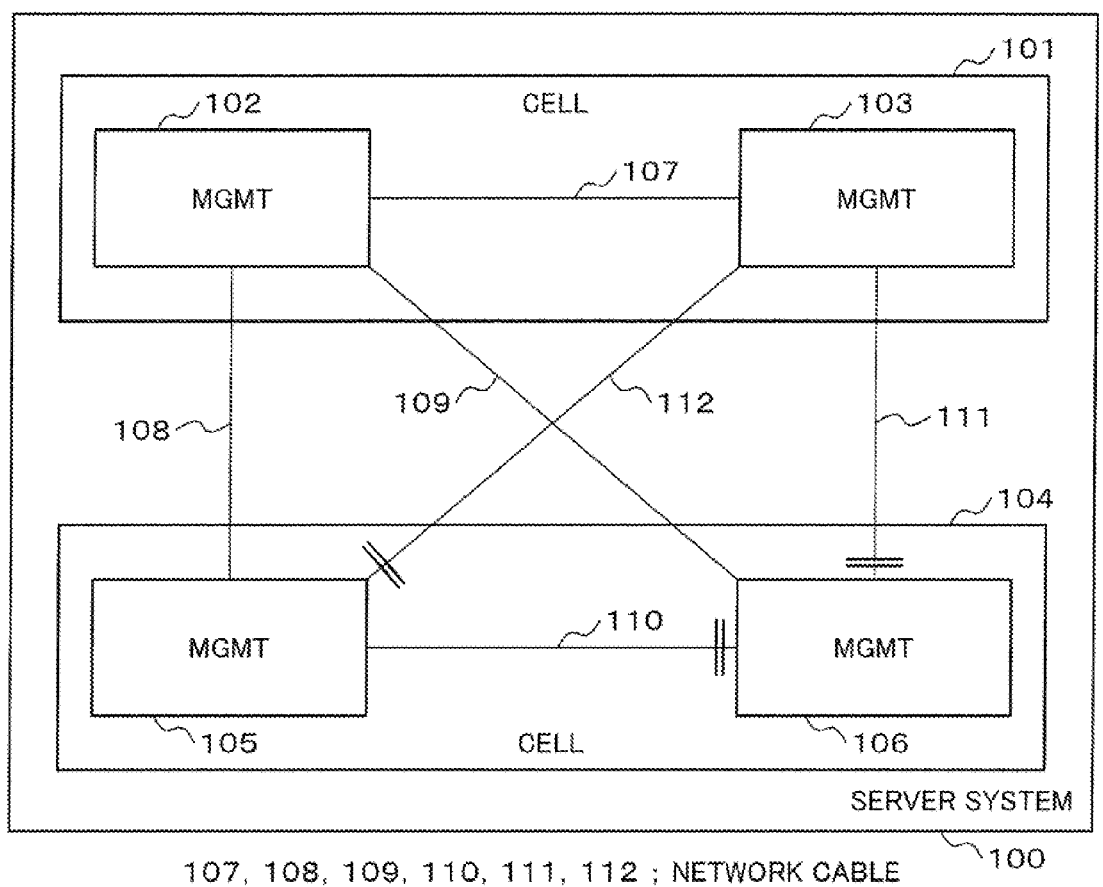
FIG. 4 is a diagram showing a logical network configuration of the server system 100 to which the STP is applied.

FIG. 4 is a diagram showing a logical network configuration of the server system 100 to which the STP is applied.

The network 107 indicates a network cable which connects the MGMT 102 and the MGMT 103. Similarly, a network 108, a network 109, a network 110, a network 111, and a network 112 are network cables for connecting the MGMT 102 and the MGMT 105, the MGMT 102 and the MGMT 106, the MGMT 105 and the MGMT 106, the MGMT 103 and the MGMT 106 and the MGMT 103 and the MGMT 105, respectively.

In FIG. 4, the network 112 for connecting the MGMT 103 and the MGMT 105 is disconnected logically using STP. Similarly, the network 111 for connecting the MGMT 103 and the MGMT 106, and the network 110 for connecting the MGMT 105 and the MGMT 106 are also disconnected logically using STP.

In a network route disconnected logically, even if an Ethernet (registered trademark) packet is transmitted, the packet is canceled without being delivered to a destination. By this, even if a physical network configuration forms loops, a broadcast storm does not occur because some of network routes are disconnected logically.

Figure 5:
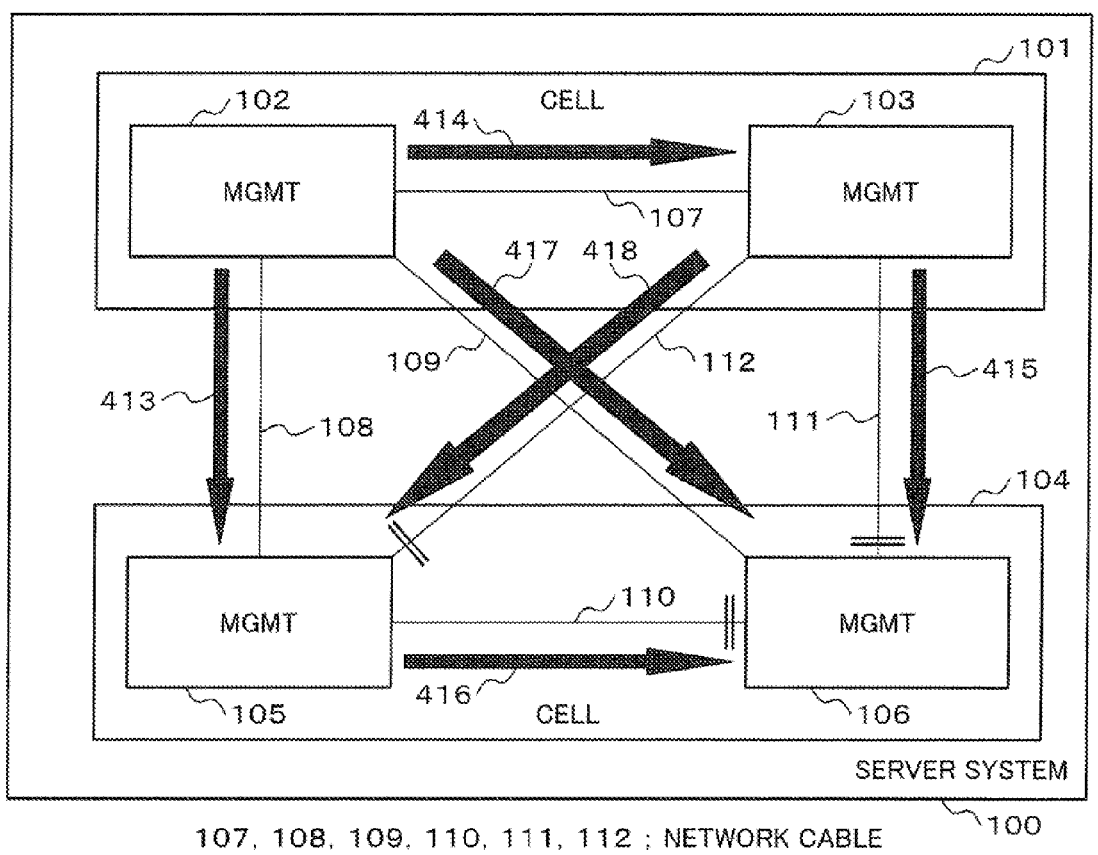
FIG. 5 is a diagram showing a flow of a BPDU (Bridge Protocol Data Unit) packet in the server system 100 to which the STP is applied.

FIG. 5 is a diagram showing a flow of BPDU (Bridge Protocol Data Unit) packet in the server system 100 to which the STP is applied.

In order to detect a network failure quickly using the STP, it is necessary to keep transmitting BPDU in one direction.

An arrow 413 shows that BPDU is transmitted to the MGMT 105 from the MGMT 102. Similarly, an arrow 414, an arrow 415, an arrow 416, an arrow 417 and an arrow 418 indicate that BPDU is transmitted to the MGMT 103 from the MGMT 102, to the MGMT 106 from the MGMT 103, to the MGMT 106 from the MGMT 105, to the MGMT 106 from the MGMT 102 and to the MGMT 105 from the MGMT 103, respectively.

Figure 6:
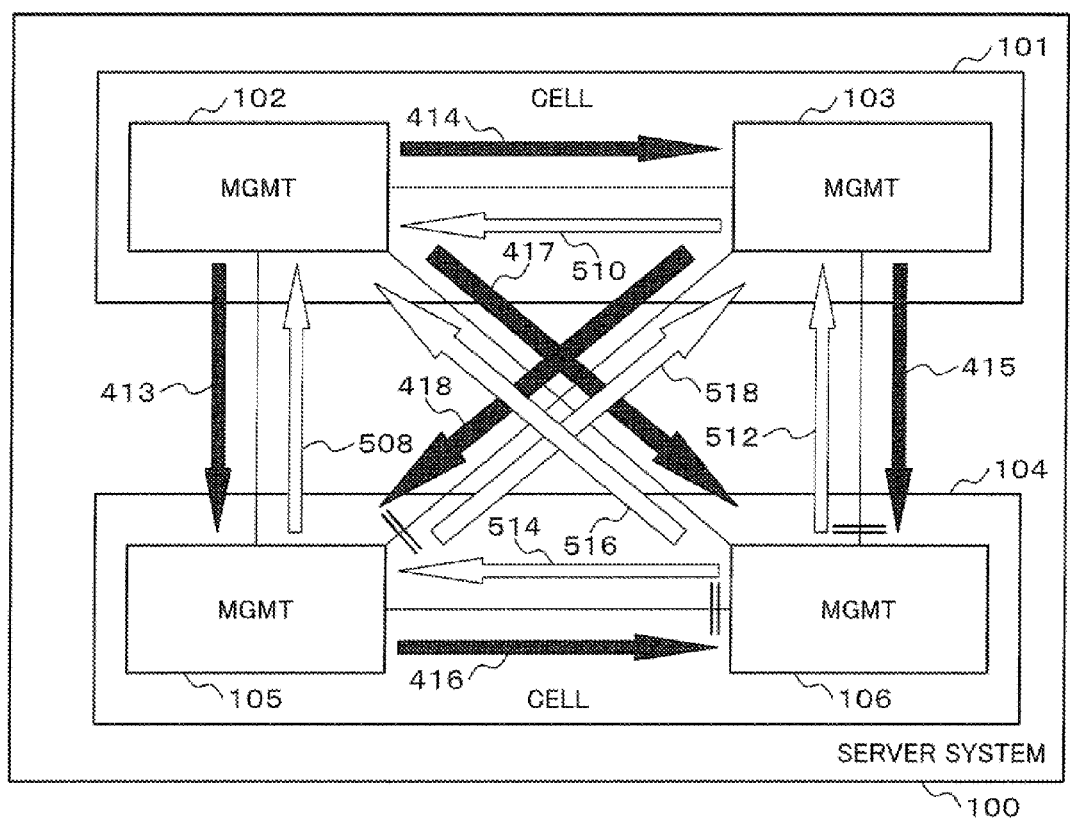
FIG. 6 is a diagram showing a flow of a BPDU packet in the server system 100 in the exemplary embodiment.

FIG. 6 is a diagram showing a flow of a BPDU packet in the server system 100 of this exemplary embodiment.

The server system 100 of the exemplary embodiment transmits BPDU also in arrow directions that are not shown in FIG. 5 in addition to the arrow directions shown in FIG. 5. FIG. 6 is a diagram indicating this. That is, an arrow 508 added in FIG. 6 shows that BPDU is transmitted to the MGMT 102 from the MGMT 105. Similarly, an arrow 510, an arrow 512, an arrow 514, an arrow 516 and an arrow 518 added show that BPDU is transmitted to the MGMT 102 from the MGMT 103, to the MGMT 103 from the MGMT 106, to the MGMT 105 from the MGMT 106, to the MGMT 102 from the MGMT 106 and to the MGMT 103 from the MGMT 105, respectively. Transmission is repeated at regular time intervals (for example, 2 seconds) for each BPDU.

Figures 9, 10:
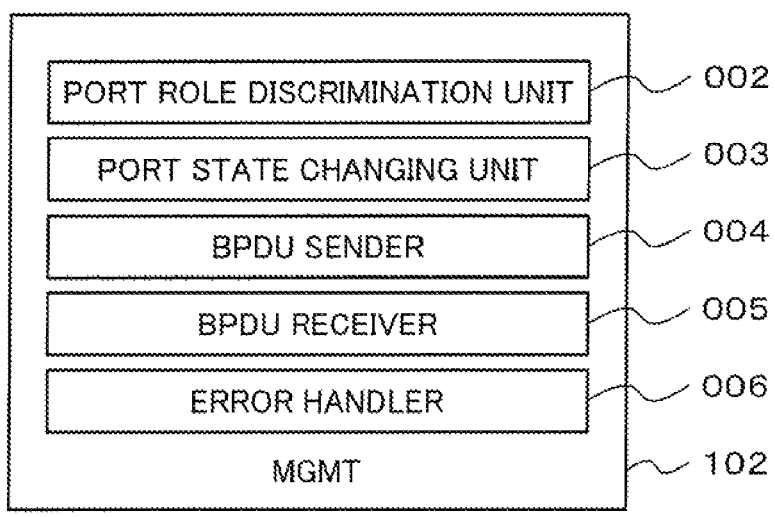
FIG. 9 is a diagram showing a network connection table.
FIG. 10 is a diagram showing the configuration of a MGMT 102.

FIG. 10 is a diagram showing the configuration of the MGMT 102. The MGMT 102 is controlled by BMPFW, and includes a Port Role discrimination unit 002, a Port State changing unit 003, a BPDU sender 004, the BPDU-receiver 005 and the error handler 006.

The Port Role discrimination unit 002 distinguishes which Port Role among RP, AP and BP a port of the MGMT 102 has. Description will be provided later about the meaning of RP, AP and BP.

The Port State changing unit 003 changes Port State of a port of a bridge (in this exemplary embodiment, MGMT) to Listening from Discarding. Description will be provided later of the meaning of the Port States, Discarding and Listening.

The BPDU sender 004 generates a Hello packet (BPDU) and transmits it to an adjacent MGMT.

The BPDU-receiver 005 receives the Hello packet from the adjacent MGMT.

The error handler 006 refers to life and death information on a daemon process included in BPDU as failure information, and when there is a problem in a daemon process, handles the problem based on a system operation control specification. For example, the error handler 006 starts the recovery process, restart the MGMT in which the problem occurred, or change the network configuration cutting off the MGMT in which the problem occurred.

Figure 7:
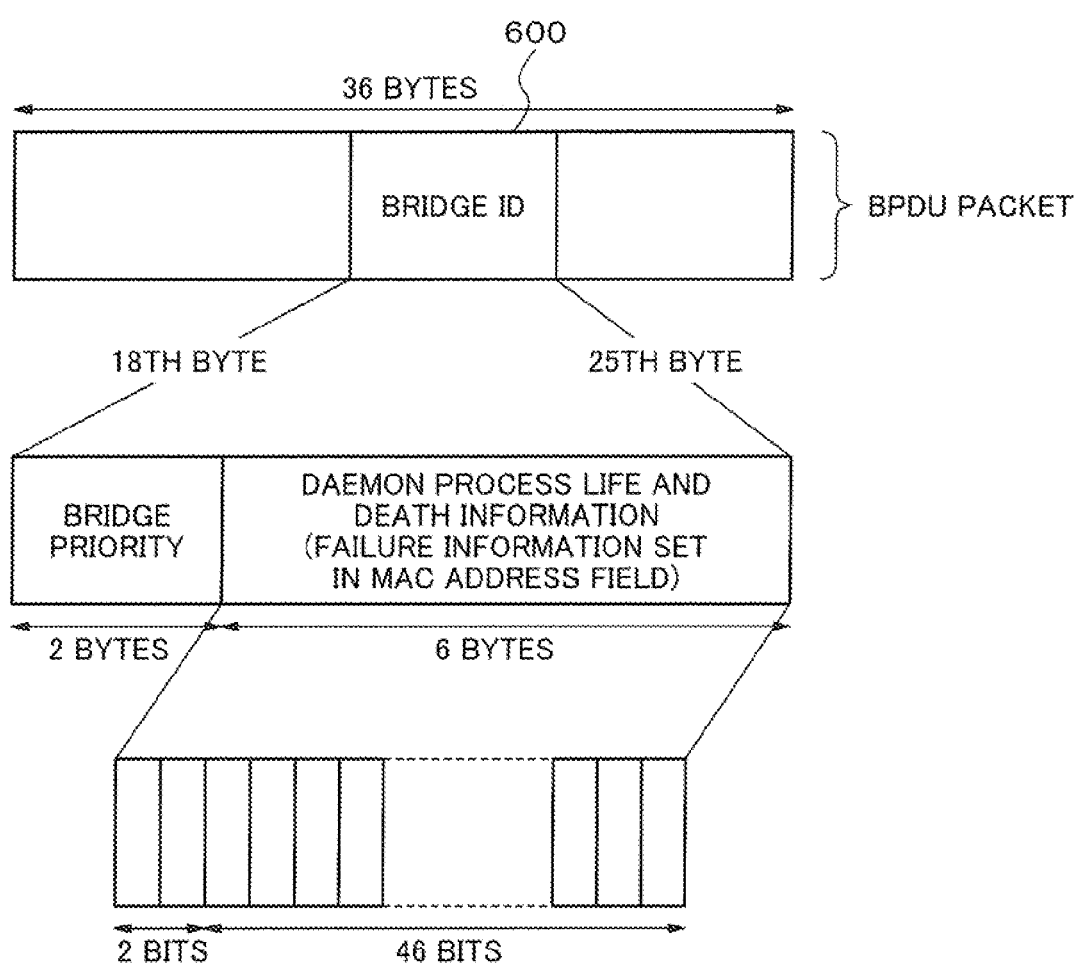
FIG. 7 is a diagram showing the composition of a bridge ID 600 of BPDU.

FIG. 7 is a diagram showing the composition of the bridge ID 600 of BPDU.

BPDU (36 bytes) includes the bridge ID 600. The bridge ID 600 is a field of 8 bytes from the eighteenth byte to the twenty-fifth byte in BPDU. The bridge ID 600 is set by a bridge (in this exemplary embodiment, each MGMT) which transmits the BPDU and contains a combination of a bridge priority (2 bytes) and a MAC address (6 bytes) according to the IEEE specification. Because the bridge ID 600 is used in order to determine the priority between a neighboring bridge and itself, information set to 6 bytes of MAC address field does not need to be a MAC address necessarily, and the field may contain any numerical value. In this exemplary embodiment, daemon process life and death information is stored in 6 bytes of this MAC address field as failure information.

However, the 6-bytes field of the bridge ID 600 is a portion which should contain a MAC address according to the IEEE specification. Two most significant bits of a MAC address is always set to a zero, because they have special meaning as Unicast/Multicast and globally unique/locally administered, respectively. The daemon process life and death information is stored using 46 bits in the 6-bytes field of the bridge ID 600.

Figure 8:
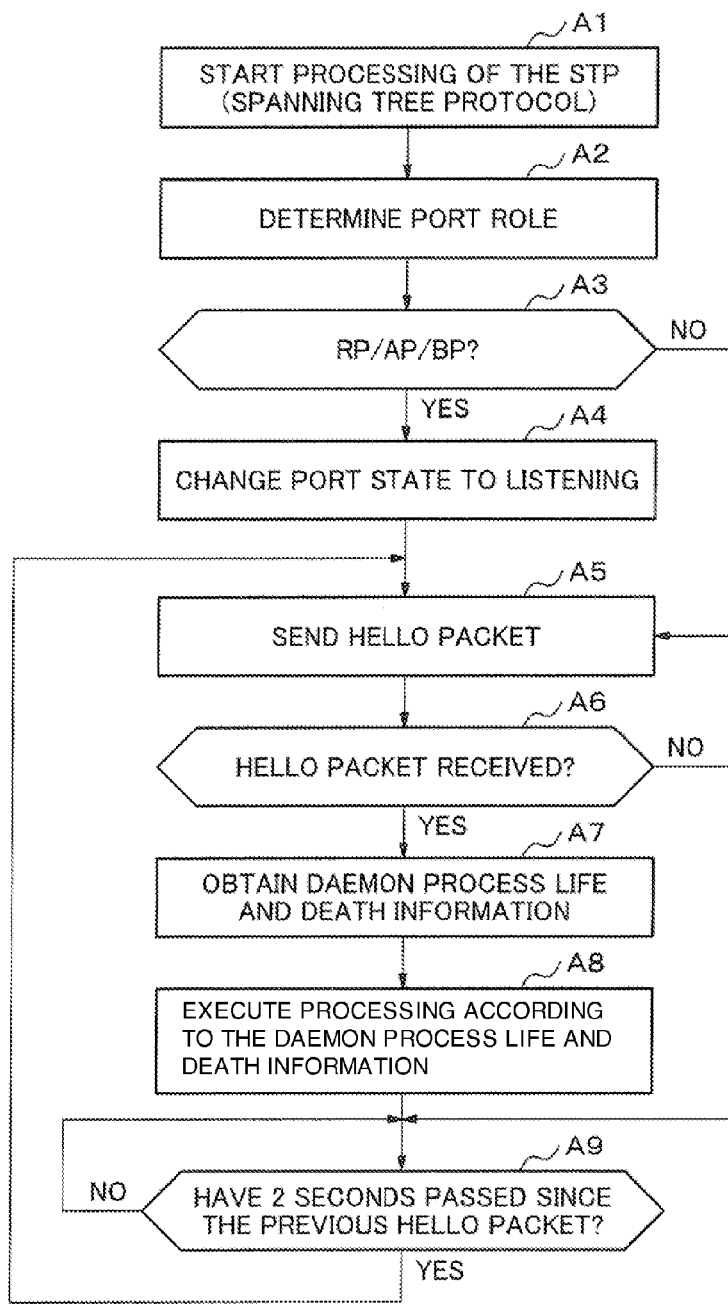
FIG. 8 is a flowchart of processing of the exemplary embodiment.

Now, the operation of the first exemplary embodiment of the present invention will be described in detail with reference to FIGS. 6 to 8. FIG. 8 is a flowchart of processing of the exemplary embodiment.

First, the server system 100 begins processing of the STP (spanning tree protocol) (A1). That is, in the server system 100 shown in FIG. 6, when the MGMT 102 and the MGMT 103 of the CELL 101 and the MGMT 105 and the MGMT 106 of the CELL 104 are powered on, BMCFW is started on respective MGMTs. In order to enable network communication between respective BMCFWs, the logical network without loops needs to be configured. So BMCFW begins processing of the STP.

Next, the server system 100 determines Port Role (A2). That is, BMCFW in each bridge (in this exemplary embodiment, MGMT) performs a negotiation with a neighboring bridge for each port in a bridge using the STP, and determines Port Role.

IEEE specifies a Rout Port (RP), a Designated Port (DP), an Alternate Port (AP), a Backup Port (BP) and a Disabled Port as types of Port Role. IEEE has further decided whether transmission and reception of BPDUs is performed in a port with the respective Port Roles. In the STP, BPDUs are sent and received only between neighboring bridges. Between two neighboring bridges, the direction where BPDUs are transmitted is one-way, and BPDUs are transmitted only from one MGMT to the other, not vice versa. According to the specification of IEEE, via a port with a port role of RP, AP and BP, a bridge does not send BPDUs but only receives them via a port with a port role of DP, a bridge transmits BPDUs in a regular time intervals (for example, 2 seconds). Because a null port is a port which is not used, BPDUs are not sent and received through it.

However, according to this exemplary embodiment, BPDUs are also sent from a port which is not a sender of BPDUs in normal STP processing. For this reason, the port role discrimination unit 002 of each MGMT distinguishes whether Port Role of each port is RP, AP or BP first (A3).

When Port Role of a port is one of RP, AP and BP (Yes at A3), the Port State changing unit 003 changes Port State of the port to Listening from Discarding so that BPDUs can be transmitted via the port (A4). According to the specification of IEEE mentioned above, a bridge cannot transmit BPDUs from a port in the Discarding state and the BPDUs received from the port are canceled. Although a bridge can send and receive BPDUs via a port in the Listening state, it cannot send and receive an Ethernet (registered trademark) packet. In both cases where Port State of a certain port is Discarding and Listening, BMCFW recognizes the port as a block port, because an Ethernet (registered trademark) packet cannot be sent and received via the port.

When processing of Step A4 has ended and Port Role of a port is not RP/AP/BP (No at A3), the BPDU sender 004 begins to generate and transmit Hello packets (BPDUs) (A5).

A Hello packet is a BPDU. However, a BPDU transmitted here is one including the bridge ID 600 shown in FIG. 7. The bridge ID 600 includes 6 bytes of daemon process life and death information. The BPDU sender 004 sets flags indicating alive/dead status of important daemon processes on BMCFW to the daemon process life and death information on a bit-by-bit basis. The BPDU sender 004 sets the life and death information to bits except for two most significant bits. Because the two most significant bits are not used in a MAC address. Therefore, 46 bits is used as the life and death information, and BMCFWs can have at most 46 daemon processes as monitoring targets.

By Step A4 and A5, the server system 100 of the exemplary embodiment can transmit BPDUs also in arrow directions that are not shown in FIG. 5 but shown in FIG. 6. (BPDU packet transmission in an opposite direction from a block port, for example.) When a Hello packet is received from an adjacent MGMT (Yes at A6), the BPDU-receiver 005 refers to the bridge ID 600 of the BPDU and acquires daemon process life and death information (A7) The error handler 006 refers to the life and death information on daemon processes, and when there is a problem with a daemon process, handle it based on the system operation control specification (A8) For example, the error handler 006 executes a system specific error-handling program for error recovery or system reconfiguration.

BPDU transmission from a bridge (MGMT) needs to be performed in a regular time intervals (for example, 2 seconds). Therefore, after Step A8 or when a Hello packet is not received (No at A6), and two seconds have passed since the last Hello packet transmission (Yes at A9), processing is returned to A5. When two seconds have not passed since the last Hello packet transmission (No at A9), Step A9 is performed again. The processing shown in FIG. 8 is continued until the server system 100 finishes the operation.

The advantages of this exemplary embodiment are as follows.

This exemplary embodiment has the effect that the communication load on a network can be reduced. Because the format of a BPDU is expanded and a BPDU packet includes failure information, the implementation of a heartbeat method to a daemon process can be omitted and the network load caused by it can be removed. As a result, this exemplary embodiment also has the effect that fail-over at the time of a MGMT failure is performed at high speed, enabling the suspension time of a service to be minimized.

Meanwhile, failure information included in a BPDU is not limited to daemon process life and death information. A BPDU may include mounted location information on CELL and MGMT as the failure information. The error handler 006 of the MGMT 102 that has received this BPDU may refer to the mounted location information on the CELL and MGMT (IDs of the CELL and MGMT) to detect a wrong-connection of a network cable, and then the error handler 006 may carry out handling for the wrong-connection.

FIG. 9 is a diagram showing a network connection table. The network connection table includes the IDs for CELL and MGMT. The error handler 006 includes this network connection table and compares the ID of the MGMT 102 and CELL 101 (#0 and #0, for example) and mounted location information on the CELL and MGMT included in BPDUS, and detects a wrong-connection of a network cable. When a wrong-connection is detected, the error handler 006 handles it based on the system operation control specification.

Figure 11:
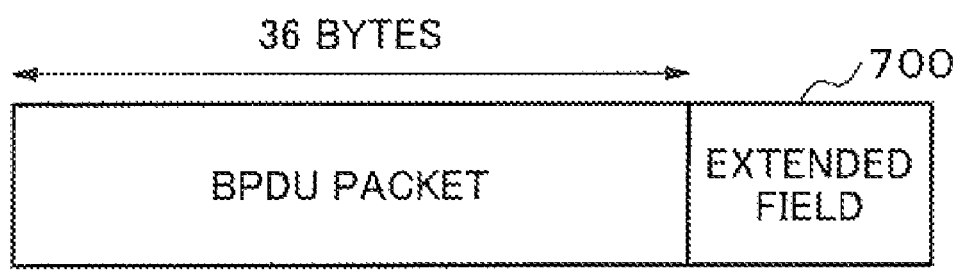
FIG. 11 is a diagram which indicates a BPDU packet to which an extended field 700 is added.

FIG. 11 is a diagram which indicates a BPDU packet to which the extended field 700 is added. In contrast to FIG. 7 in which the bridge ID 600 includes failure information, a BPDU packet may be extended and the extended field 700 that is a field starting from the thirty-seventh byte (offset) may store failure information as shown in FIG. 11.

The present invention has the effect that the communication load on a network is reduced.

While the invention has been particularly shown and described with reference to exemplary embodiments thereof, the invention is not limited to these exemplary embodiments. It will be understood by those of ordinary skill in the art that various changes in form and details may be made therein without departing from the spirit and scope of the present invention as defined by the claims.

What is claimed is:

1. A bridge control method comprising:
   transmitting a BPDU (Bridge Protocol Data Unit) packet, wherein the BPDU packet is the BPDU packet of an STP (Spanning Tree Protocol) and includes a MAC (Media Access Controller) address field that includes information indicating an occurrence of a failure other than a failure of a bridge identified by the MAC address field.

2. A bridge, comprising: a BPDU (Bridge Protocol Data Unit) sender which transmits a BPDU packet, wherein the BPDU packet is the BPDU packet of an STP (Spanning Tree protocol)and includes a MAC (Media Address Controller) address field that includes information indicating an occurrence of a failure other than a failure of the bridge identified by the MAC address field.

3. The bridge according to claim 2, in that
   said BPDU sender transmits the BPDU packet to another bridge via a network.

4. The bridge according to claim 2, in that
   said BPDU packet includes 0 in highest 2 bits of said MAC address field.

5. The bridge according to claim 3, in that
   said BPDU packet includes 0 in highest 2 bits of said MAC address field.

6. The bridge according to claim 2, comprising
   a MGMT (ManaGeMenT board), in that said MGMT is included in a CELL which is a base board of a server system, and
   said BPDU packet includes mounted location information of the destination CELL and of the MGMT in said MAC address field.

7. The bridge according to claim 3, comprising
   a MGMT (ManaGeMenT board), in that said MGMT is included in a CELL which is a base board of a server system, and
   said BPDU packet includes mounted location information of the destination CELL and of the MGMT in said MAC address field.

8. The bridge according to claim 4, comprising
   a MGMT (ManaGeMenT board), in that said MGMT is included in a CELL which is a base board of a server system, and
   said BPDU packet includes mounted location information of the destination CELL and of the MGMT in said MAC address field.

9. The bridge according to claim 2, comprising:
   a BPDU receiver which receives the BPDU packet including the failure information where in the packet is the BPDU packet of the STP; and
   an error handler which performs a process based on a system operation control specification when there is a failure by referencing said failure information which is included in the BPDU packet which said BPDU receiver received.

10. The bridge according to claim 3, comprising:
    a BPDU receiver which receives the BPDU packet including the failure information wherein the packet is the BPDU packet of the STP; and
    an error handler which performs a process based on a system operation control specification when there is a failure by referencing said failure information which is included in the BPDU packet which said BPDU receiver received.

11. The bridge according to claim 4, comprising:
    a BPDU receiver which receives the BPDU packet including the failure information wherein the packet is the BPDU packet of the STP; and
    an error handler which performs a process based on a system operation control specification when there is a failure by referencing said failure information which is included in the BPDU packet which said BPDU receiver received.

12. The bridge according to claim 5, comprising:
    a BPDU receiver which receives the BPDU packet including the failure information wherein the packet is the BPDU packet of the STP1; and
    an error handler which performs a process based on a system operation control specification when there is a failure by referencing said failure information which is included in the BPDU packet which said BPDU receiver received.

13. The bridge according to claim 2, comprising:
    a port which has a port role of any one of RP (Root Port), AP (Alternate Port), and BP (Backup Port); and
    a port state changing unit which changes a port status of said port from Discarding to Listening.

14. The bridge according to claim 3, comprising:
    a port which has a port role of any one of RP (Root Port), AP (Alternate Port), and BP (Backup Port); and
    a port state changing unit which changes a port status of said port from Discarding to Listening.

15. The bridge according to claim 4, comprising:
    a port which has a port role of any one of RP (Root Port), AP (Alternate Port), and BP (Backup Port); and
    a port state changing unit which changes a port status of said port from Discarding to Listening.

16. The bridge according to claim 5, comprising:
    a port which has a port role of any one of RP (Root Port), AP (Alternate Port), and BP (Backup Port); and
    a port state changing unit which changes a port status of said port from Discarding to Listening.

17. The bridge according to claim 6, comprising:
    a port which has a port role of any one of RP (Root Port), AP (Alternate Port), and BP (Backup Port); and
    a port state changing unit which changes a port status of said port from Discarding to Listening.

18. A system, comprising:
    a first bridge including a BPDU (Bridge Protocol Data Unit) sender which transmit a BPDU packet, wherein the BPDU packet is the BPDU packet of an STP(Spanning Tree Protocol) and includes a MAC (Media Access Controller) address field that includes information indicating an occurrence of a failure other than a failure of the first bridge identified by the MAC address field; and
    a second bridge connecting with said first bridge via a network and receiving said BPDU packet.

19. A computer-readable recording medium recording thereon a program which makes a computer function as:
 a sender which transmits a BPDU (Bridge Protocol Data Unit) packet, wherein the BPDU packet is the BPDU packet of an STP (Spanning Tree Protocol) and includes a MAC (Media Access Controller) address field that includes information indicating an occurrence of a failure other than a failure of a bridge identified by the MAC address field.

* * * * *